March 24, 1970   J. P. KINSLEY   3,501,809
APPARATUS FOR FORMING PLASTIC ARTICLES
Filed June 27, 1967   4 Sheets-Sheet 1

J. P. KINSLEY   INVENTOR

BY

ATTORNEY

J. P. KINSLEY INVENTOR
BY Jack Matalon
ATTORNEY

March 24, 1970        J. P. KINSLEY        3,501,809
APPARATUS FOR FORMING PLASTIC ARTICLES
Filed June 27, 1967        4 Sheets-Sheet 4

J. P. KINSLEY    INVENTOR

ATTORNEY

United States Patent Office

3,501,809
Patented Mar. 24, 1970

3,501,809
APPARATUS FOR FORMING PLASTIC ARTICLES
John P. Kinsley, Cuyahoga Falls, Ohio, assignor to Esso Research and Engineering Company, a corporation of Delaware
Filed June 27, 1967, Ser. No. 649,293
Claims priority, application Canada, July 21, 1966, 965,976
Int. Cl. B29c 3/02, 17/07
U.S. Cl. 18—20                 5 Claims

ABSTRACT OF THE DISCLOSURE

This disclosure relates to a blow-molding machine for continuously preparing bottles or the like from tubular thermoplastic material. The blow-molding machine consists of a rotary mechanism having a plurality of molds arranged in a rotary fashion. The indexing sequence and actuation of the machine component parts are, through camming means, accurately and positively co-ordinated and synchronized for variable machine speeds and in addition, a positive locking device is provided to retain the mold halves in closed relation during the molding operation.

---

This invention relates to a method of fabricating hollow articles such as containers from an extruded thermoplastic material in tubular form and is particularly directed to an improved continuous blow-molding machine for making bottles or the like from tubular thermoplastic material.

Heretofore, the manufacture of plastic containers has involved the use of expensive and bulky equipment generally inefficient in use in that a multiplicity of molds arranged about a machine axis for rotation thereabout is substantially idle for 30–40% of its travel.

It is also known to provide a machine for the production of plastic containers wherein the molds are mounted for vertical, circular rotation about a horizontal axis.

These conventional blow-molding machines are equipped with a dog and tooth indexing mechanism involving the use of drive belts for moving each mold from station to station. During the periods of time in which the molds are stationary the belts continue their travel over the drive pulleys resulting in rapid wear to the belts and consequent erratic behavior of the indexing device.

In conventional blow-molding machines, the molding wheel serving as a mounting plate for the molds is restricted in its forward rotary motion by a shock absorber which, under the frequent stops and starts necessary for the operation, deteriorates rapidly resulting in undesirable machine vibration. Once the shock absorber has arrested the forward motion of the molding wheel, mechanical latches hold the wheel in its desired position for the index. These latches are frequently out of adjustment, through the aforementioned shock absorber deterioration, with the result that the molding drum occasionally rotates uncontrollably until it is caught by the drive dog. The entire index period normally is thrown out of alignment necessitating a shutdown of the system for re-adjustment and re-synchronization of the components of the system.

Conventional machines of this type also suffer from the disadvantage that mold halves are independently operated, reliance being placed on friction to maintain contact between the mold-closing mechanisms. After a short period of service, the friction-bearing parts of the mechanism wear unevenly, resulting in loss of friction and a variation in the platen movement of each mold half. Therefore, one mold half often reaches its closed position before the other, causing the parison to be pushed aside, with a resultant flaw in the blown article.

It is, therefore, a principal object of the present invention to provide a machine for the manufacture of plastic containers which eliminates the disadvantages inherent in continuous rotary machines of the types heretofore known.

A further object of the invention is the provision of a novel continuous blow-molding machine for the manufacture of hollow articles from tubular thermoplastic material in which sagging of the thermoplastic material and non-symmetrical conformation within the mold cavities is obviated.

An additional object of the invention is to provide a novel machine of the foregoing character in which the indexing sequence and actuation of the machine component parts are accurately and positively co-ordinated and synchronized for variable machine speeds.

A further object of the invention is the provision of a positive locking device to retain the mold halves in closed relation obviating mechanical work and wear.

Still another object of the invention is to provide a machine for molding hollow, thermoplastic articles rapidly and accurately, while producing a high quality product.

These and other objects of the invention and the manner in which they can be attained will become apparent from the following detailed description of the drawings, in which.

Like reference characters refer to like parts throughout the description of the drawings.

Figure 1:
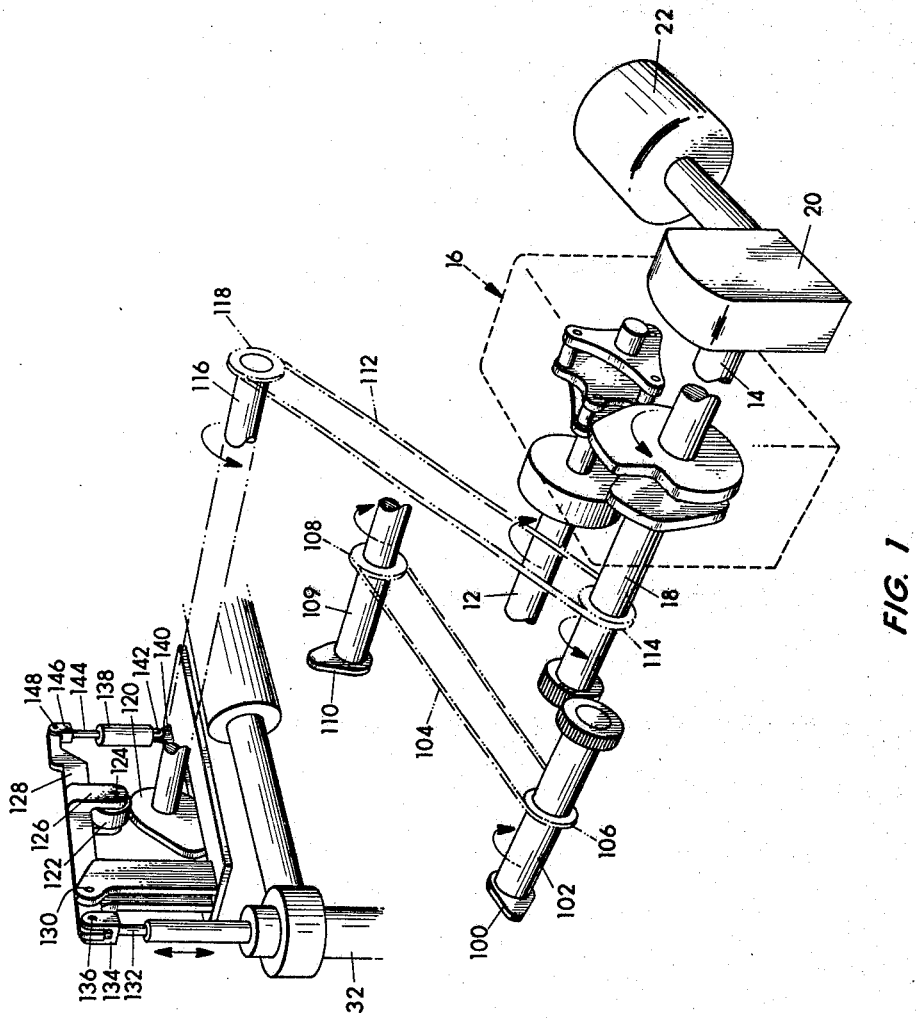
FIGURE 1 is a schematic view showing the conjugate cam assembly mechanically linking the molding machine components.

With particular reference to FIGURE 1 of the drawing, the preferred embodiment of the present invention generally comprises a four-station rotary mechanism having a main shaft 12 connected to output shaft 14 of drive assembly 16. Assembly 16 is of a conjugate cam type having indexing output shaft 14 in parallel with a continuously rotating output shaft 18 for reasons which will become apparent as the description proceeds. Drive assembly 16 in turn is operatively connected to gear reducer 20 which is driven by high-speed synchronous motor 22, gear reducer 20 preferably being of a variable speed type to permit adjustment of the speeds of output shafts 14 and 18.

Figure 2:
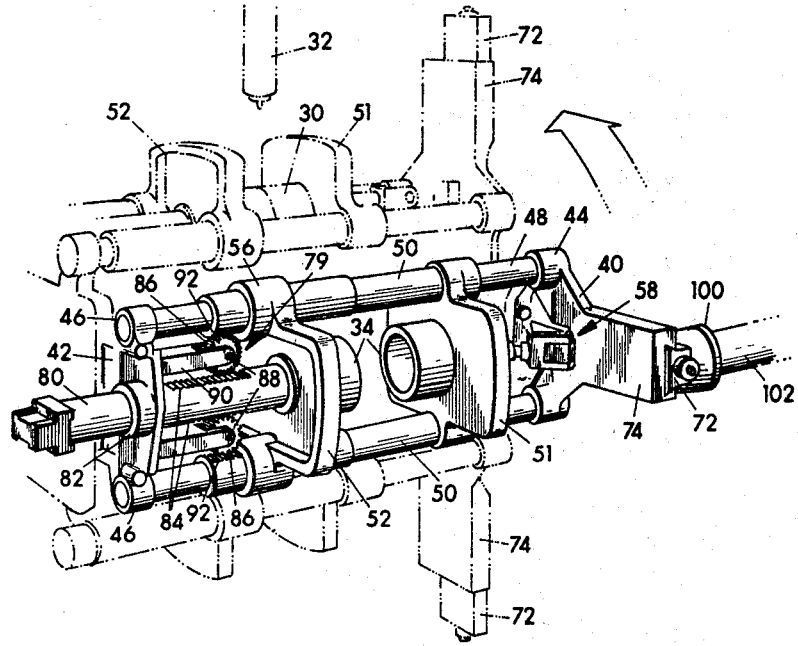
FIGURE 2 is a perspective view of mold platen supports and actuating mechanism in an unloading station.
Figure 3:
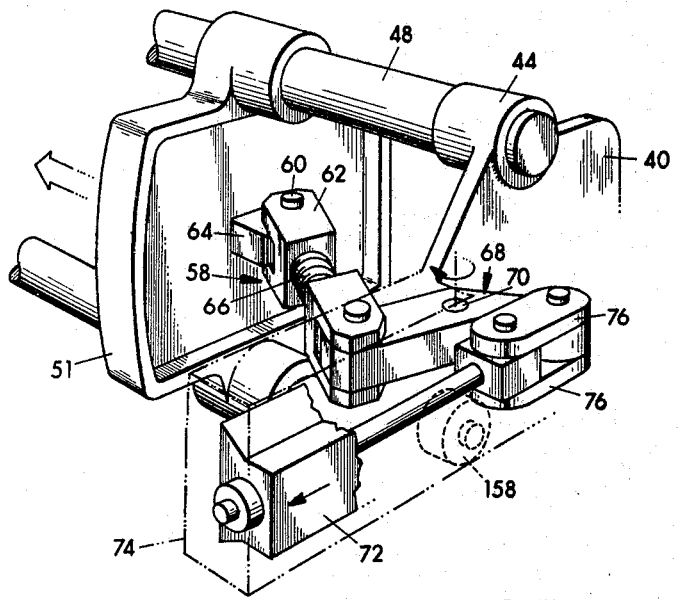
FIGURE 3 is a detailed view of the toggle joint assembly illustrated in FIGURE 2.
Figure 4:
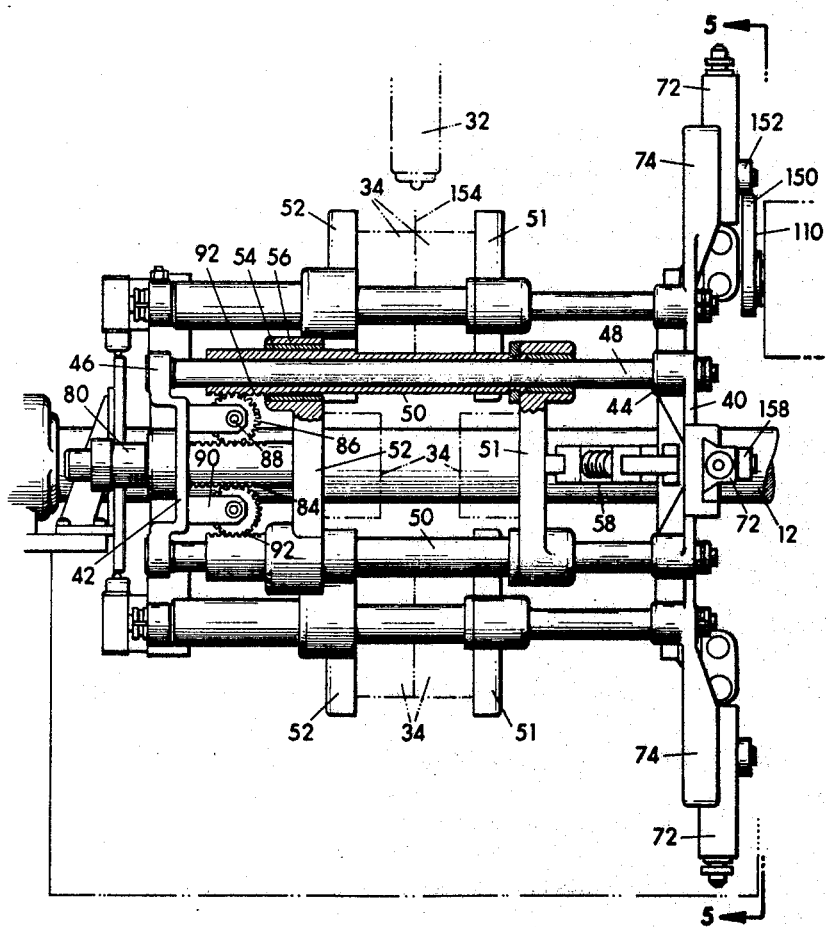
FIGURE 4 is a side elevation, partly in section, of the embodiment of the invention illustrated in FIGURES 1 and 2.

With reference now to FIGURES 2–4, the mold support structure of the present invention will be described with the molds located in an indexing position, upper molds 30 being in a parison-receiving position relative to extruding nozzle 32 and molds 34 being in the station-discharging position at the completion of the molding cycle.

The description will now proceed with reference to the mold support assembly shown in FIGURE 2 at the unloading station illustrated by the solid lines. It will be understood, however, that each mold assembly will be identical and although the embodiment illustrated and described herein comprises four separate molds angularly equispaced at 90° about the main shaft, it may be desired to employ three, six or eight equispaced molds about a shaft in combination with and operatively connected to a conjugate cam mechanism adapted to index at 120°, 60° or 40° positions respectively.

Each support comprises a bracket 40 rigidly flanged onto and extending radially from drive shaft 12 in proximity to drive assembly 16. A bracket 42 is likewise secured to the opposite end of drive shaft 12 in opposing relationship to bracket 40. Bosses 44 formed in the sides of bracket 40 and bosses 46 likewise formed in the sides of bracket 42 are adapted to receive in rigid engagement tie rods 48 in parallel relationship to each other and to shaft 12. A pair of sleeves 50 slidably mounted on tie rods 48, as illustrated most clearly in FIGURE 4, are each rigidly secured, at one end, to platen 51 by lock ring 53 and set screws or the like connecting means not shown. A second platen 52 is slidably mounted at each side on sleeves 50 by means of bushings 54 interposed between sleeves 50 and platen sockets 56.

FIGURE 3 illustrates in detail a knee-action toggle joint 58 pivotally connected to the outer surface of platen 51 by bolt 60 extending through fork 62 enclosing platen flange 64. Arm 66 is likewise pivotally connected to bell crank 68 pivoted about shaft 70 rigidly mounted on bracket 40. The opposite end of bell crank 68 is pivotally connected to cam follower 72 keyed for reciprocal movement in extension 74 of bracket 40 by means of interconnecting opposed plates 76 as will be evident from the illustration. Reciprocal lineal movement of cam follower 72 as will be described hereinbelow pivots bell crank 68 about the fixed axis of shaft 70 causing, as illustrated by the arrows in FIGURE 3, platen 51 to move away from bracket 40 upon outward radial movement of cam follower 72. Bell crank 68 is adapted, upon full extension of arm 66 to slightly pass over centre such that an opposite force on platen 51 will lock the assembly in place and prevent movement thereof.

Platen 52 slidably mounted on sleeves 50 as has been described, is actuated by a rack and pinion assembly designated by numeral 79 and comprises a rod 80 substantially in alignment with and secured perpendicular to the centre of the said plate and extending through socket 82 formed in bracket 42 for slidable movement therein. Teeth 84 formed in the opposite sides of rod 80 are adapted to receive teeth of gear wheels 86 mounted adjacent rod 80 on each side thereof by stub shafts 88 extending through support arms 90 rigidly secured to the inner walls of bracket 42. Teeth 92 formed in the opposing, inner surfaces of sleeves 50 are adapted for engagement with the teeth of gear wheels 86 and it will be evident that as platen 51 is moved on tie rods 48 by means of actuating mechanism 58 the lineal motion thereof will be transmitted to platen 52 for opposite symmetrical motion by sleeves 50, rotating gear wheels 86 which in turn advance or retract rod 80 and platen 52 carried thereby.

Figure 5:
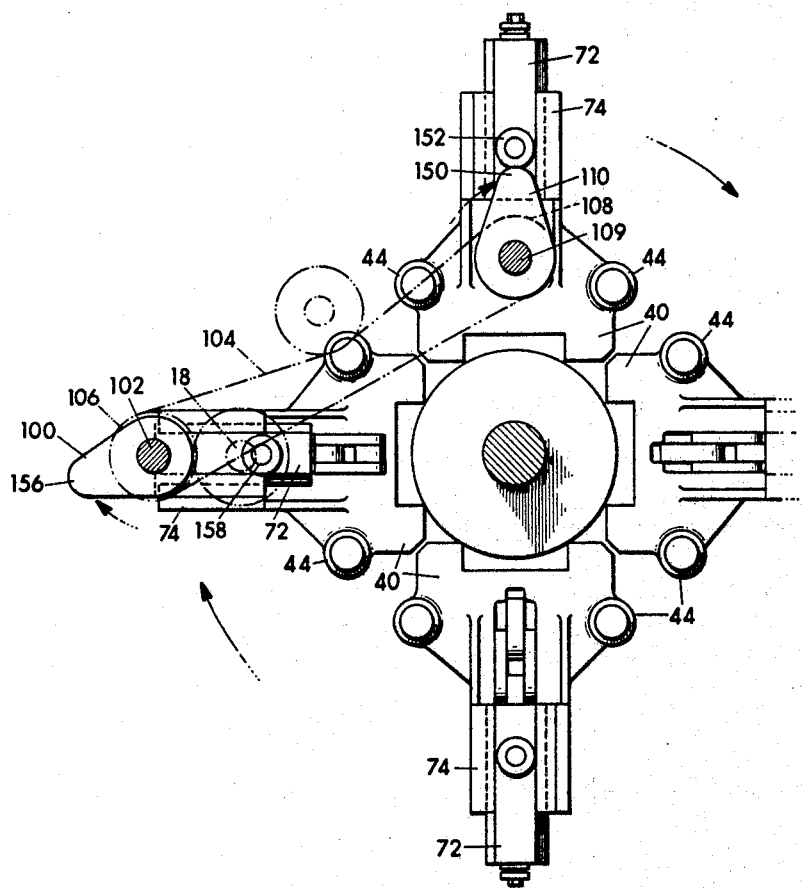
FIGURE 5 is an end elevation, partly in section, along the lines 4—4 of FIGURE 3 showing the mold control mechanism in the machine indexing position.

With particular reference to FIGURES 1, 4 and 5, the cam actuating apparatus of the invention will now be described with reference to the mechanism in the indexing position. A cam 100 rotatably mounted on shaft 102 is coupled to and driven continuously by output shaft 18 of assembly 16. Chain 104 interconnecting sprocket wheel 106 keyed to shaft 102 with sprocket wheel 108 keyed to shaft 109 transmits the rotational movement of cam 100 to cam 110.

Cam 100 is disposed in the position of the unloading station of the machine and cam 110 is disposed in the parison receiving position of the machine in the indexing position.

Chain 112 interconnecting sprocket wheel 114 keyed to shaft 18 transmits rotational movement of shaft 18 to shaft 116 by means of sprocket wheel 118 keyed to shaft 116.

Cam 120 is keyed to shaft 116 and engages roller 122 arranged for rotational movement about shaft 124 extending through support arms 126 rigidly attached to arm 128. Arm 128 pivots about shaft 130 in response to engagement of roller 122 with cam 120 and actuates rod 132 rigidly fixed to fork 134 adapted to pivot about shaft 136.

Rod 132 is operatively connected to a needle valve (not shown) which is stepped at its lower end for shutting off the extrudate after closure of the mold halves.

Air cylinder 138 is pivotally affixed to flange 140 about pin 142. Shaft 144 arranged for reciprocal movement within cylinder 138 is rigidly affixed to fork 146 which is pivotally attached to arm 128 at pin 148.

In operation, the conjugate cam drive assembly 16 provides an intermittent rotation to the main shaft 12 of the mechanism whereby the molds carried by said shaft are indexed at 90° angular intervals commencing with the loading station at the peak of rotation and terminating at an unloading station at the 270° angular displacement position. An extruded, elongated, open-ended tube of high density polyethylene or polypropylene, for example, is disposed between the opened mold halves 30 of the sectional mold carried by the opposing platens 51–52 of the uppermost support. When the extrudate has reached the desired length, continuously rotating cam 120 engages roller 122 to pivot arm 128 upwardly, depressing rod 132 to momentarily shut off the extrudate through actuation of the needle valve (not shown). Similarly, through precise shaping of cam 120, the degree of actuation of the needle valve varies to provide an extrudate having a wall of varying thickness, resulting in a blown container having a wall of equal thickness, irrespective of its shape.

Positive pressure is maintained in air cylinder 138 to exert a downward force on arm 128, and retaining roller 122 in contact with cam 120. The machine is indexed in the desired loading position a sufficient time to receive the length of tubing necessary to form a parison at which time cam 110 rotates whereby lobe 150 engages wheel 152 rotatably mounted on cam follower 72 displacing said follower radially outwardly thereby extending bell crank 68 and arm 66 operatively connected thereto for extending platen 51 and mold half 30 carried thereby towards the centre line designated by numeral 154. As has been discussed hereinabove with reference to the description of the structure, platen 52 is likewise advanced towards the centre line 154 by the rack and pinion assembly 79 whereby the mold halves symmetrically close upon the parison severing the upper end of the extruded tube and pinching together the open ends of the parison.

Immediately upon closing of the mold halves the machine is rotated through 90° to the next index position and concurrently therewith, a blowing needle positioned on each of the mold units is pneumatically injected into the upper portion of the parison and air injected into the parison at a pressure of about 150 p.s.i.g. forcing the walls of the molten thermoplastic material against the walls of the mold to assume the configuration thereof. Air is thus injected into the parison while the longitudinal axis of the parison is in a substantially vertical position and prior to movement of the mold away from the loading station. Air pressure preferably is maintained inside the mold for a period of about 10 seconds while the parison is cooled, the blowing needle then being pneumatically removed from the mold wall prior to discharge of the cooled product.

The mold containing a blown parison travels through 270° of rotation during which a cooling liquid such as water circulated through the mold cools the parison such that the walls thereof solidify and the article has attained its permanent configuration. The mold arriving at the unloading station is opened by cam lobe 156 of cam 100, engaging wheel 158 pivotally mounted on cam follower 72 for moving said cam follower radially inwardly whereby bell crank 68 is pivoted in a counter-clockwise position as viewed in FIGURE 3 and arm 66 and platen 51 connected thereto retracted. Opposing platen 52 is likewise retracted by the rack and pinion assembly 79 symmetrically opening the mold halves and permitting dislodgement and removal of the blown article.

The conjugate cam drive with parallel output shafts operatively coupled together and to the components of the machine permits synchronized functioning of the machine for correlation of parison extrusion rate with index cycle and mold actuation.

The invention provides a number of important advantages. Speed adjustment of the indexing rate can be precisely controlled and co-ordinated with extruder output. Rapid cycling time with fine control adjustment can be attained, the conjugate cam drive providing a continuous and positive functional relationship between the indexing motion of the mold and individual mold actuation into opened and closed positions.

The motion of the mold sections are interconnected by a posiitve toggle action, rack and pinion mechanism to insure controlled, symmetrical closure of the mold sections together onto and extruded parison. The knee-action toggle joint automatically clamps the molds into their locked positions from the time of closure of the molds until the molds are opened at the unloading station. Blowing of the parison into the final configuration is completed while the parison is retained in its initial centered position. Machine sub-assemblies can be readily fabricated in component parts which are easy to remove and service.

It will be understood, of course, that modifications can be made in the preferred embodiments of the invention described and illustrated herein without departing from the scope and purview of the appended claims.

What is claimed is:

1. An apparatus for making hollow plastic articles from softened tubular plastic material comprising, in combination: an elongated a shaft mounted for rotatable movement about a horizontal axis; a plurality of angularly equispaced supports each comprising a pair of parallel, spaced rods rigidly secured a fixed equal distance from said elongated shaft and parallel thereto for rotation therewith; a pair of platens for supporting mold sections and adapted for symmetrical reciprocal movement away from and towards each other slidably mounted on each pair of said rods; platen-actuating means for symmetrically moving said platens on said rods, and platen-actuating means each comprising a pair of sleeves slidably mounted on the rods for axial movement thereon, one of said platens rigidly secured to one end of the sleeves and the other platen slidably mounted on said sleeves, means for moving said platen rigidly secured to said sleeves away from and towards the other platen whereby said sleeves are moved axially on said rods, and rack and pinion means operatively connected to the other platen actuable by the movement of said sleeves for moving said other platen in unison with said platen rigidly secured to one end of said sleeves; indexing means for intermittently rotating said elongated shaft through an angular displacement equal to the angular spacing of each pair of supports establishing a loading station at the peak of rotation and a discharge station prior to the peak of rotation, said intermittent rotating means being co-ordinated with said platen actuating means for closing said mold sections at the loading station and opening said mold sections at the unloading station; and camming means for positively connecting said elongated shaft indexing means in synchronization with said platen actuating means.

2. An apparatus for making hollow plastic articles from softened tubular plastic material comprising, in combination: a main shaft mounted for rotation on a horizontal axis; a plurality of supports comprising brackets secured to said shaft at each end thereof in opposing relationship extending radially outwardly from said shaft in equispaced circumferential arrangement; a pair of tie-rods rigidly interconnecting said opposed brackets, each pair of said tie-rods having a pair of platens for carrying mold sections slidably mounted thereon for synchronous, reciprocal movement away from and towards each other; actuating means provided on each said support for selectively moving said carried mold sections into abutting relationship and for extending said mold sections away from each other for receiving said tubular plastic material; drive means having a pair of output shafts one of which is adapted to continuously rotate and the other of which is adapted to rotate intermittently through an angle equal to the angular spacing of said supports; camming means operatively connected to said continuously rotating shaft for engaging said actuating means for closing said mold sections at the peak of rotational travel of said mold sections about the horizontal shaft and for opening said mold sections at the station before opening of said mold sections, said intermittently rotating shaft being positively operatively connected to said continuously rotating shaft, said actuating means for moving said platen rigidly secured to the sleeves comprising a knee-action toggle joint pivotally connected to a reciprocally mounted cam follower adapted to be actuated by said continuously rotating shaft.

3. In an apparatus as claimed in claim 2, a rod rigidly connected to said second platen having teeth formed on opposite sides thereof, said rod being adapted for guided axial reciprocal movement, teeth formed on the inner opposing surfaces of said sleeves, and gear wheels interposed between each of said sleeves and said toothed rod and mounted for rotation whereby axial movement of said sleeves is transmitted to said rod urging said rod in the direction of movement opposite to movement of said sleeves.

4. In an apparatus as claimed in claim 1, said indexing means comprising two lobed cams mounted on the continuously rotating shaft and adapted for engagement with at least two cam followers mounted on a second shaft parallel to said continuously rotating shaft, said second shaft rotating through 90° with each engagement with said two lobed cams, said continuously rotating shaft being operatively connected to a variable speed drive means.

5. In an apparatus as claimed in claim 4, said camming means comprising a first lobed cam mounted for rotation by said continuously rotating shaft, a second lobed cam mounted at one end of a freely rotatable shaft, said freely rotatable shaft being located to engage the second lobed cam with said actuating means for closing said mold sections at the loading station, said first lobed cam adapted to engage the actuating means to open said mold sections at the unloading station, and a chain driving mechanism operatively connecting said first lobed cam with said second lobed cam.

References Cited

UNITED STATES PATENTS

| | | |
|---|---|---|
| 2,359,216 | 9/1944 | Hofmann et al. |
| 2,858,564 | 11/1958 | Sherman et al. |
| 3,005,231 | 10/1961 | Pechthold. |

WILBUR L. McBAY, Primary Examiner

U.S. Cl. X.R.

18—5